United States Patent Office 3,433,131
Patented Mar. 18, 1969

3,433,131
CONTROL SYSTEMS FOR HYDRAULIC POWER UNITS
Ingebret Söyland and Kristian Söyland, Bryne, near Stavanger, Norway
Continuation of application Ser. No. 420,308, Dec. 22, 1964. This application Aug. 22, 1967, Ser. No. 662,543
U.S. Cl. 91—447          3 Claims
Int. Cl. F15b 11/08, 13/04

ABSTRACT OF THE DISCLOSURE

A double-acting power cylinder having its ends connected to two sets of fluid delivery and fluid return valves which are equipped with pressure relief means for opening and closing the same. A pilot valve is connected to the pressure relief means of the two sets of valves and is selectively positionable to open the delivery and return valve in either set while closing those in the other set.

---

This application is a continuation of copending application Ser. No. 420,308, filed Dec. 22, 1964, and now abandoned.

The present invention relates to a control system for hydraulic power units.

The main object of the invention is to provide a control system which may be operated entirely by hydraulic pressure, yet brings about a sensitive control of the working cycle of the power unit.

It has been known to provide hydraulic drive systems with safety valves equipped with a by-pass passage and automatically controlled by a pilot valve. However, the known safety valves only limit the maximum pressure in the hydraulic system and have no influence on the actual operation of the power unit.

According to the present invention there is provided a control device for a hydraulically operated power unit in which the flow of pressure fluid to and from the actuator of said unit is controlled by valves automatically operated by the pressure fluid and equipped with a restricted by-pass opening in which fluid flow is blocked or permitted by a small pilot valve.

Further objects and advantages of the invention will become apparent from the following description when considered with reference to the accompanying drawings in which.

Figure 1:
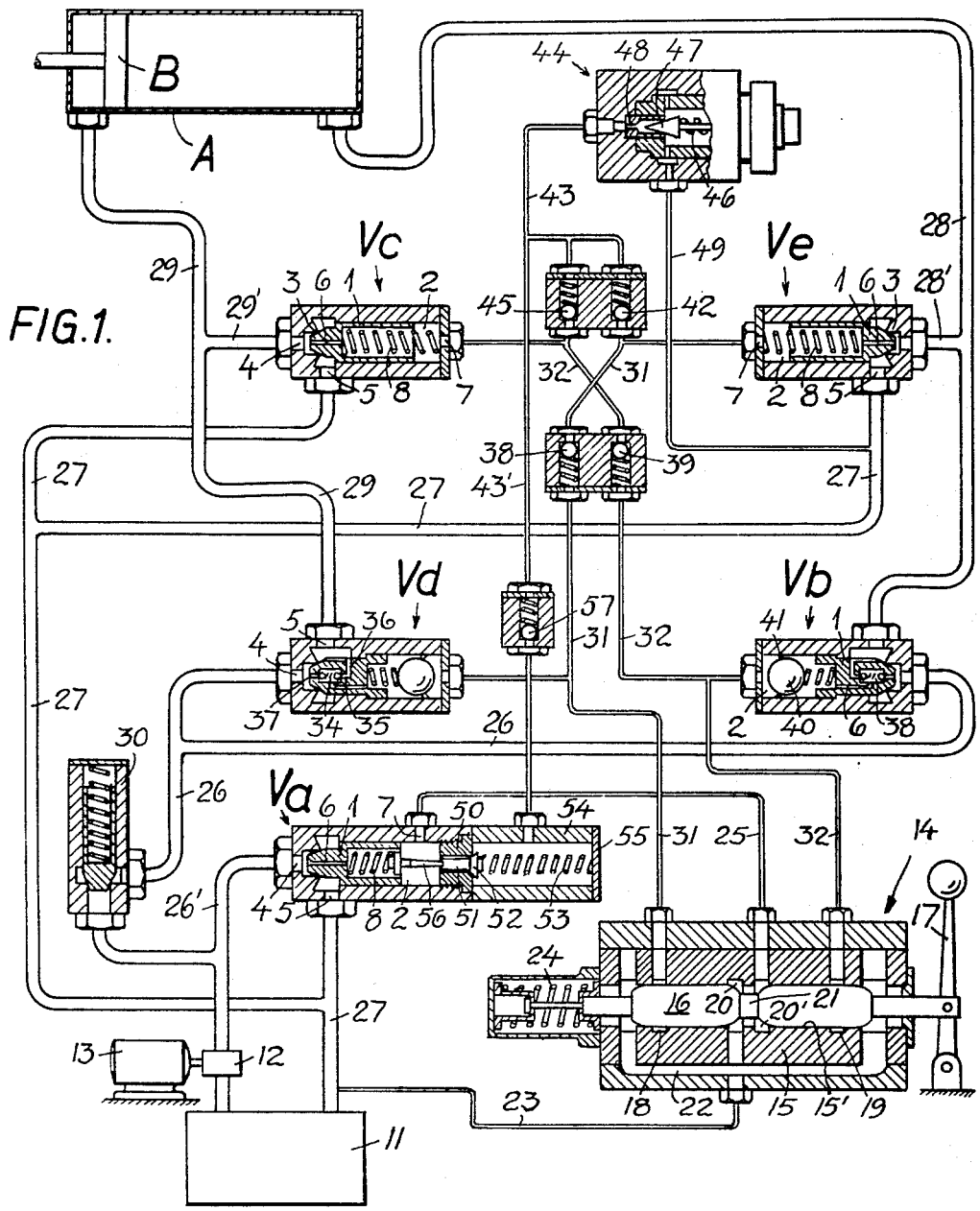
FIG. 1 shows a control device of the invention in elevational section.
Figure 3:
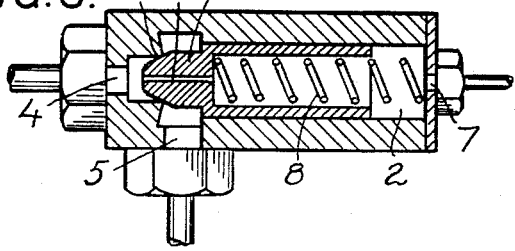
FIGS. 3, 4 and 5 show individual valves of the apparatus of FIG. 1 on a larger scale.

The principal features and the operation of the hydraulically controlled valves of the system shown in FIG. 1 are similar. The common features are illustrated in FIG. 3 and include a valve piston 1 displaceably supported in a bore 2 of a valve housing. The front end of said piston 1 is adapted to seal a valve seat 3 which normally connects an inlet 4 with an outlet 5. A longitudinal, restricted bore or opening 6 in the piston 1 forms a by-pass between the inlet 4 and the portion of the bore 2 behind the rear end of the piston 1.

The rear end of the bore 2 is connected by a discharge port 7 with a pilot conduit leading to a control valve, which will be described below. The valve piston 1 is biased toward the valve seat 3 by a weak closing spring 8. Its rear face opposite the discharge or pressure relief port 7 is slightly greater than the front face engageable with the valve seat 3.

The valve shown in FIG. 3 operates in the following manner:

When the pilot conduit connected to the port 7 is open, pressure fluid supplied to the inlet 4 displaces the piston 1 rearwardly and flows freely to the outlet 5. If the pilot conduit is closed, pressure fluid entering the inlet 4 cannot displace the piston 1 against the resistance of the spring 8 and flows through the by-pass 6 to the rear end of the valve bore 2, thereby assisting the valve closing action of the spring 8. In this manner, the valve is automatically locked by the pressure fluid within a few tenths of a second.

FIG. 1 shows a control system for a hydraulic cylinder A with a piston B. Hydraulic fluid is supplied from a tank 11 by means of a pump 12 driven by a motor 13.

A pilot valve 14 controls several valves of the above-described type. It has a housing 15 with a bore 15' in which a plunger 16 may be moved axially by means of an operating lever 17. The valve plunger 16 controls four annular channels 18, 19, 20, 20' in the bore 15'. The channels 20 and 20' communicate in the centered or inoperative position of the plunger 16 through an annular groove 21 in the plunger 16. The channel 20 is connected by a longitudinal channel 22 in the housing 15 and a conduit 23 to the storage tank 11 of the hydraulic system. The plunger 16 is biased by a spring 24 towards its inoperative or centered position.

The annular channel 20' is connected by a conduit 25 to the port 7 of a valve Va which controls a by-pass conduit 26' between the discharge conduit 26 of the pump 12 and a return conduit 27 leading to the tank 11. The valve Va will be referred to hereinafter as "starting valve."

The hydraulic system further comprises two valves Vc and Ve whose outlets 5 are connected to the return conduit 27, and two valves Vb and Vd whose outlets respectively are connected to the two ends of the cylinder A by conduits 28, 29. A branch 28' of the conduit 28 is connected to the inlet of the valve Ve, while the conduit 29 has a branch 29' connected to the inlet of the valve Vc. The inlets of the valves Vd and Vb are connected to the pump discharge conduit 26 through a check valve 30.

The discharge ports 7 of the valves Vb and Vc are connected by a pilot conduit 32 to the channel 19 of the pilot valve 14, and the ports 7 of the valves Vd and Ve are connected by a pilot conduit 31 to the annular channel 18.

Further details of the structure shown in FIG. 1 will be described in connection with the operation of the system.

When the pilot valve 14 is in the illustrated centered position, the conduit 25 communicates with the tank 11 so that the starting valve Va cannot be closed while the pilot conduits 31 and 32 are closed. If the pump 12 is operated, oil flows from the by-pass conduit 26' through the valve Va and returns to the tank 11.

If the plunger 16 of the valve 14 is moved a little to the left from the position shown in FIG. 1 until the pilot conduit 32 is opened, oil may flow from the conduit 29 through the port 7 of the valve Vc and through a check valve 39 in the conduit 32 to the tank 11. Similarly, oil is drained from the port 7 of the valve Vb to the tank 11. The channel 18 connected by the pilot conduit 31 to the valves Vd and Ve is closed, and the conduit 25 from the channel 20' of the valve 14 is still open.

If the plunger 16 is moved further into its left end position, the pilot conduit 32 remains open and the pilot conduit 31 remains closed, while the conduit 25 from the channel 20' is closed, whereby the valve Va is closed immediately and prevents flow of oil from the pump discharge conduit 26 through the by-pass 26' to the return conduit 27. Oil is forced by the pump 12 through the check valve 30, the valve Vb and the conduit 28 to the right end of the cylinder A. The piston B moves towards the left and displaces oil from the cylinder A through the conduit 29, the branch 29', the valve Vc and the conduit 27 to the tank 11.

Figure 4:
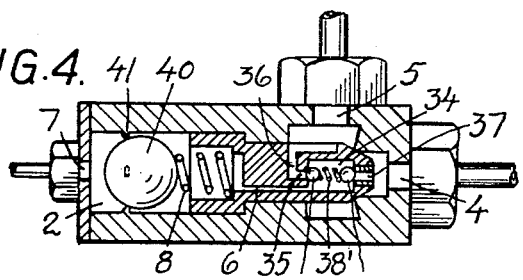

While valves Vc and Ve are structurally identical to the valve illustrated in FIG. 3, the structure of the generally identical valves Vb and Vd is better seen in FIG. 4. A chamber 34 in the front end of the valve bore 6 is provided with an axial inlet 35 connected through a radial channel 36 to the outlet 5 and thereby to one of the conduits 28, 29, while another inlet 37 of the chamber 34 is connected to the inlet 4 and thereby to the conduit 26. The inlets 35, 37 are normally blocked by check valves 35', 37' under the pressure of an interposed spring 38'.

When normal operating pressure prevails in the conduits 26, 28, hydraulic fluid under pressure is supplied through the inlets 37, 35 and the check valves 27', 35' to the chamber 34 of the valve Vb, and the check valve 35' of the valve Vd prevents oil from the chamber 34 of valve Vd being discharged through the conduit 29 to the tank 11 through the open valve Vc. Hydraulic fluid under full operating pressure is supplied from the chamber 34 of the valve Vd through the by-pass 6 to the valve Vd, while a check valve 38 in the pilot conduit 31 shuts off further flow of oil in that conduit. A similar check valve 39 is provided in the pilot conduit 32. The valve Vd therefore is blocked.

At the same time, oil flows through the by-pass 6 of the valve Vb and the pilot conduit 32 to the tank 11, so that the valve Vb remains open. The branch 29' of the conduit 29 communicates freely with the tank 11 and therefore only an insignificant amount of oil flows through the by-pass 6 of the valve Vc whose port 7 is connected to the tank 11 through the check valve 39 and the pilot conduit 32.

Loss of oil from the pressure side of the cylinder A through the valves Vb and Vd is held to a minimum by a ball 40 in the rear of the bore 2 in each valve, but of a smaller diameter than the bore. The ball engages spaced projections 41 under pressure of the valve spring 8 and normally permits free passage of oil. The sleeve-shaped rear end of the valve piston 1 forms a seat which sealingly engages the ball 40 when the valve is fully opened.

The fluid pressure in the conduit 28 is transmitted through the valve Ve, a portion of the pilot conduit 31, a check valve 42 and a conduit 43 to a pilot valve 44. Similarly, the pilot conduit 32 is connected to the conduit 43 by a check valve 45 which prevents flow of oil toward the pilot conduit 32.

The pilot valve 44 has a conically shaped plug 47 biased by a spring 46 toward a position in which it blocks a narrow inlet 48 from the conduit 43 while an outlet behind the plug 47 is connected through a conduit 49 to the return conduit 27 and thereby to the tank 11.

When the valves Vc and Ve operate as safety or shock valves, the flow resistance of the pilot valve 44 is regulated in accordance with the desired holding or shock pressure.

Figure 5:
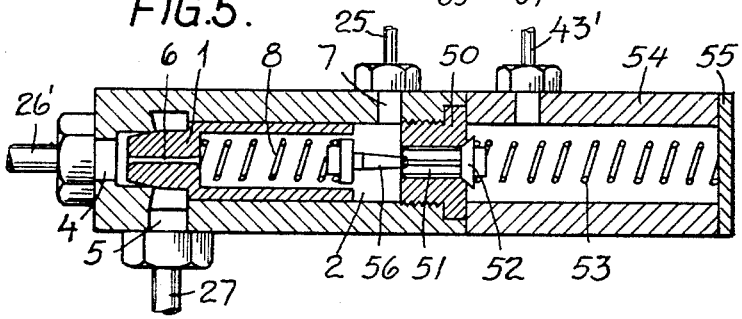

As is best seen in FIG. 5, the front end of the valve piston 1 of the valve Va is only slightly tapered, whereby it has to move a relatively long distance between the closed and the fully open position.

The rear end of the bore 2 in the valve Va is partly obstructed by a plug 50 having an axial bore in which the stem 51 of a small conical valve 52 is received. The valve 52 is biased by a spring 53 into closing engagement with the plug 50. The valve 52 and the spring 53 are received in a sleeve 54, one axial end of which is secured tot he rear end of the housing of the valve Va and the other end of which is closed by a disc 55. The enlarged end 56 of the valve stem 51 is abuttingly engaged by the closing spring 8 of the valve piston 1. The conduit 25 from the valve 14 is connected to the discharge outlet 7 of the valve Va which is positioned ahead of the valve 52. The sleeve 54 is connected through a check valve 57 to the conduit 43 by a branch 43' so that oil may flow from the valve Va through the valve 52, check valve 57 and conduit 43 to the pilot valve 44, whereby the latter may control the valve Va when operating as a safety valve set for a maximum working pressure.

When the cylinder A has performed its work and the pilot valve 14 is returned to the centered position, the valve Va is again free to return oil from the pump 12 to the tank 11 and the valve Vb is closed. The valve Ve maintains pressure in the cylinder A to hold a load which was lifted and therefore operates as a shock valve.

If the piston B has to perform work while moving in the opposite direction, the pilot valve 14 is moved from the centered position to the right (FIG. 1), whereby the channel 18 and the pilot conduit 31 are opened to the tank 11, while the channel 19 for the pilot conduit 32 and the channel 20 for the conduit 25 are closed.

The valves Ve and Vd are vented to the tank 11 through the pilot conduit 31 and are therefore open to passage of pressure fluid. The valve Va is under pressure since the conduit 25 to its discharge port 7 is closed and oil from the pump 12 is directed through the conduit 26, the valve Vd and valve 29 to the left end of the cylinder A. At the same time, oil is discharged from the right end of the cylinder A through the conduits 28, 28' and the valve Ve to the tank 11.

When it is desired to prevent the piston B from striking against the end walls of the cylinder A, small electrically or mechanically operated valves may be provided in the pilot conduits 32, 31. Each small, normally open valve 63, 64 (see FIG. 2) has a cone-shaped closing member, a spring and a pressure member. A rod 65 is secured to the piston rod C of the piston B and is provided with abutments 66, 67, aligned with the pressure members of the valves 64 and 63.

Figure 2:
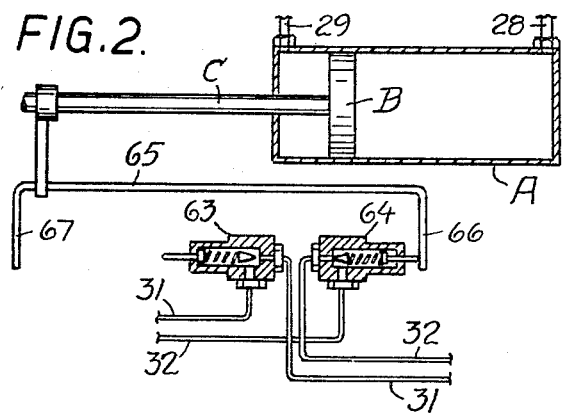
FIG. 2 shows a modification of the device of FIG. 1.

If the piston B in the working cylinder A is moved towards the left, as viewed in FIGS. 1 and 2, the abutment 66 engages the pressure member of the valve 64 as the piston B approaches the end of its leftward stroke, so that the spring of the valve 64 is compressed and the valve member closes the pilot conduit 32. The valve 64 thereby causes the valves Vb and Vc to close and the piston B is stopped before it reaches the end of the cylinder A. The piston is stopped at the other end of the cylinder by means of the valve 63 in the same manner.

What is claimed as new is:

1. In a hydraulic system, the combination of a double-acting power cylinder having a reciprocable piston and first and second fluid lines communicating with said cylinder at opposite sides of the piston, said first fluid line being branched to provide a first fluid delivery line and a first fluid return line, said second fluid line being branched to provide a second fluid delivery line and a second fluid return line, a fluid reservoir having a return condit connected to the first and second fluid return lines, a pump receiving fluid from said reservoir and having a delivery conduit connected to the first and second fluid delivery lines, first and second delivery valves provided in the respective first and second fluid delivery lines, first and second return valves provided in the respective first and second fluid return lines, each of said delivery and return valves including fluid pressure relief means operative to hold the valve closed when the relief means are closed and to open the valve when the relief means are open, a pilot valve having an outlet port discharging into said reservoir, a first inlet port connected to the relief means of the first delivery valve and of the second return valve, a second inlet port connected to the relief means of the second delivery valve and of the first return valve, a third inlet port intermediate the first and second inlet ports, said pilot valve also having a valve member movable between a first extreme position wherein said first inlet port is open to said outlet port while the second inlet port is closed, a second extreme position wherein said second inlet port is open to said outlet port while the first inlet port is closed, and an intermediate position wherein said third inlet port is open to said outlet port while the first and second inlet ports are closed, a by-pass valve having an inlet connected to said delivery conduit of said pump, an outlet discharging into said reservoir, and fluid pressure relief means operative to hold the by-pass valve closed when the relief means thereof are closed and to open the by-pass valve when the relief means thereof are open, said third inlet port of said pilot valve being connected to the pressure relief means of said by-pass valve, a first branched pressure relief line providing the aforesaid connection of the first inlet port of said pilot valve to the pressure relief means of said first delivery valve and second return valve, a second pressure relief line providing the aforesaid connection of the second inlet port of the pilot valve to the pressure relief means of said second delivery valve and first return valve, a normally closed excess pressure relief valve having an inlet and also having an outlet discharging into said reservoir independently of the outlet port of said pilot valve, and a branched pressure relief conduit communicating said first and second pressure relief lines and the pressure relief means of said by-pass valve with the inlet of said excess pressure relief valve.

2. The system as defined in claim 1 wherein said pilot valve member also has a second intermediate position wherein said second and third inlet ports are open to said outlet port while the first inlet port is closed, whereby to permit drainage of fluid from the relief means of said first return valve and of said second delivery valve while fluid from the pump is recirculated through said by-pass valve, said third inlet port of the pilot valve being closed when said valve member is moved to either of its extreme positions, whereby to close the by-pass valve while fluid from the pump is delivered to said cylinder.

3. The system as defined in claim 1 wherein each of said delivery and return valves and said by-pass valve comprises a valve body having inlet and outlet port means in one end portion thereof, a plunger reciprocable in said valve body for opening and closing said port means, and resilient means biasing said plunger to its port means closing position, said pressure relief means communicating with the other end of the valve body and including a restricted orifice in said plunger whereby the latter may be unseated by fluid pressure from said port means against the bias of said resilient means when said pressure relief means are open and whereby the plunger may close the port means as a combined function of fluid pressure and resilient bias when the pressure relief means are closed.

References Cited

UNITED STATES PATENTS

| 3,151,455 | 10/1964 | Tennis | 91—448 |
| 3,304,842 | 2/1967 | Shafer | 91—454 |
| 3,326,087 | 6/1967 | Gohlke et al. | 91—461 |

CARROLL B. DORITY, Jr., *Primary Examiner.*

U.S. Cl. X.R.

91—452, 454, 461